United States Patent
Sanin et al.

(10) Patent No.: US 9,485,239 B2
(45) Date of Patent: Nov. 1, 2016

(54) IMPLEMENTING SINGLE SIGN-ON ACROSS A HETEROGENEOUS COLLECTION OF CLIENT/SERVER AND WEB-BASED APPLICATIONS

(71) Applicant: Citrix Systems, Inc., Fort Lauderdale, FL (US)

(72) Inventors: Aleksey Sanin, Sunnyvale, CA (US); Christopher Toomey, Cupertino, CA (US); Alan Keister, Oakton, VA (US); Andrew L. Wick, McLean, VA (US); Robert Watkins, Vienna, VA (US); Xiaopeng Zhang, Oak Hill, VA (US); Russell Richards, Nokesville, VA (US); Donald Eaves, Aldie, VA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 152 days.

(21) Appl. No.: 14/334,586

(22) Filed: Jul. 17, 2014

(65) Prior Publication Data
US 2014/0325621 A1  Oct. 30, 2014

Related U.S. Application Data

(63) Continuation of application No. 12/390,110, filed on Feb. 20, 2009, now Pat. No. 8,832,787, which is a continuation of application No. 10/424,995, filed on Apr. 29, 2003, now Pat. No. 7,500,262.

(60) Provisional application No. 60/375,821, filed on Apr. 29, 2002.

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/41* (2013.01); *G06Q 20/3674* (2013.01); *H04L 9/3234* (2013.01); *H04L 9/3271* (2013.01); *H04L 63/0815* (2013.01); *H04W 12/06* (2013.01)

(58) Field of Classification Search
CPC ..... H04L 63/08; H04L 9/3234; H04L 9/271; G06F 21/41; G06Q 20/3674; H04W 12/06
See application file for complete search history.

(56) References Cited

U.S. PATENT DOCUMENTS

| | | |
|---|---|---|
| 5,241,594 A | 8/1993 | Kung |
| 5,442,342 A | 8/1995 | Kung |

(Continued)

FOREIGN PATENT DOCUMENTS

EP        1089516 A2    4/2001

OTHER PUBLICATIONS

"Risks of the Passport Single Signon Protocol," David P. Kormann et al., IEEE Computer Networks, Jul. 2000.

(Continued)

*Primary Examiner* — Techane Gergiso
(74) *Attorney, Agent, or Firm* — Banner & Witcoff, Ltd.

(57) ABSTRACT

Leveraging an established authenticated session in obtaining authentication to a client application includes receiving a request for access to a client application requiring authentication of a requestor and determining whether there exist characteristics of leverageable authentications corresponding to established sessions having an authenticated state at a time of the determination. When the determination reveals characteristics of at least one leverageable authentication corresponding to an established session, and attempt is made to obtain access for the requestor to the client application based on the at least one leverageable authentication, and the requestor is provided with a notification related to the 1 attempt to obtain access for the requestor to the client application.

20 Claims, 9 Drawing Sheets

(51) Int. Cl.
*G06F 21/41* (2013.01)
*G06Q 20/36* (2012.01)
*H04L 9/32* (2006.01)
*H04W 12/06* (2009.01)

(56) References Cited

U.S. PATENT DOCUMENTS

| | | | |
|---|---|---|---|
| 5,596,632 | A | 1/1997 | Curtis et al. |
| 5,684,950 | A | 11/1997 | Dare et al. |
| 5,892,828 | A | 4/1999 | Perlman |
| 6,035,404 | A | 3/2000 | Zhao |
| 6,115,040 | A | 9/2000 | Bladow et al. |
| 6,178,511 | B1 | 1/2001 | Cohen et al. |
| 6,182,142 | B1 | 1/2001 | Win et al. |
| 6,243,816 | B1 | 6/2001 | Fang et al. |
| 6,253,327 | B1 | 6/2001 | Zhang et al. |
| 6,275,944 | B1 | 8/2001 | Kao et al. |
| 6,338,138 | B1 | 1/2002 | Raduchel et al. |
| 6,453,353 | B1 | 9/2002 | Win et al. |
| 6,510,466 | B1 | 1/2003 | Cox et al. |
| 6,598,167 | B2 | 7/2003 | Devine et al. |
| 6,606,708 | B1 | 8/2003 | Devine et al. |
| 6,609,198 | B1 * | 8/2003 | Wood ............... G06F 21/31 713/155 |
| 6,629,246 | B1 | 9/2003 | Gadi |
| 6,668,322 | B1 | 12/2003 | Wood et al. |
| 6,826,696 | B1 * | 11/2004 | Chawla ............ H04L 63/0815 713/168 |
| 6,892,307 | B1 | 5/2005 | Wood et al. |
| 7,016,875 | B1 | 3/2006 | Steele et al. |
| 7,069,433 | B1 | 6/2006 | Henry et al. |
| 2002/0010776 | A1 * | 1/2002 | Lerner ............. H04L 63/0815 709/225 |
| 2002/0138728 | A1 | 9/2002 | Parfenov et al. |
| 2002/0144119 | A1 | 10/2002 | Benantar |
| 2002/0176582 | A1 | 11/2002 | Aull |
| 2002/0184507 | A1 | 12/2002 | Makower et al. |
| 2003/0028768 | A1 | 2/2003 | Leon et al. |
| 2003/0061512 | A1 * | 3/2003 | Flurry ............. H04L 63/0815 726/4 |
| 2003/0105981 | A1 | 6/2003 | Miller et al. |
| 2003/0158945 | A1 | 8/2003 | Liu |
| 2003/0182551 | A1 | 9/2003 | Frantz et al. |
| 2005/0074126 | A1 | 4/2005 | Stanko |
| 2008/0144119 | A1 | 6/2008 | Otake |

OTHER PUBLICATIONS

"Microsoft .NET Passport Technical Overview," Microsoft Corporation, Sep. 2001.

* cited by examiner

IMPLEMENTING SINGLE SIGN-ON ACROSS A HETEROGENEOUS COLLECTION OF CLIENT/SERVER AND WEB-BASED APPLICATIONS

CROSS REFERENCE TO RELATED APPLICATIONS

This application is a continuation of and claims priority to U.S. patent application Ser. No. 12/390,110, filed Feb. 20, 2009, and entitled "Implementing Single Sign-On Across a Heterogeneous Collection of Client/Server and Web-Based Applications," which is a continuation of and claims priority to U.S. patent application Ser. No. 10/424,995, filed Apr. 29, 2003, and entitled "Implementing Single Sign-On Across a Heterogeneous Collection of Client/Server and Web-Based Applications," which claims priority to U.S. Provisional Patent Application Ser. No. 60/375,821, filed Apr. 29, 2002, and entitled "System for Leveraging Concurrent Authentication to Hall A Secured System." The entire content of the prior applications is incorporated herein by reference.

TECHNICAL FIELD

This description relates to leveraging the authentication used to enable access to client/server applications, and more particularly, to the timely determination of the availability of an authenticated session to be leveraged and cross-client leveraging of authentication using a standard web browser.

BACKGROUND

Client/server applications generally include a "client" that runs on an access device (e.g., a personal computer (PC) or a mobile phone) with which the user interacts, and a "server" that runs on a remote server computer. The client and the server typically communicate over a network, like the Internet, by sending messages back and forth to each other.

Client/server applications may or may not incorporate or otherwise leverage a browser. As such, client/server applications may be browser-type applications (e.g., www.aol.com) which generally include a web site accessed using a browser, or non-browser type applications (e.g., AOL Instant Messenger) which generally include a desktop client.

Client/server applications may be supported by dedicated client software or they may be supported by client/server software capable of supporting multiple client/server applications. For example a web browser may support one client/server application (e.g., a browser-type application), or it may support multiple client/server applications (e.g., non-browser type applications).

Many client/server applications are designed to support one or more specific individual users such that they necessitate authentication of the particular person interacting with the client. The authentication may be managed by the client/server applications, enabling the users to authenticate themselves with site-specific credentials for each web site.

One common way for the client/server application to manage authentication of its users involves having the client request credentials (e.g., user name and password) from the users. The client then submits the credentials to the server, and the server validates the credentials (e.g., by verifying that the submitted credentials match previously-established credentials known to the server). A successful authentication establishes an application session for the user, which typically persists until terminated by the user (e.g., by logging out or closing the client software); terminated by the client (e.g., automatically after an idle period); or terminated by the server (e.g., the server crashes).

SUMMARY

An authenticated session can be leveraged to permit a user to access multiple client/server applications as a result of a single sign-on experience. Authentication leveraging can be implemented for browser and non-browser clients. For browser clients, authentication leveraging can be achieved using a standard browser, which facilitates integration of authentication leveraging.

When the web site of a secured system is accessed, it may be desirable to quickly determine whether to display an interface soliciting manual entry of user authentication criteria (i.e., whether leveraged authentication may be used to obtain access without manual entry of authentication criteria). Such an interface may be rendered unnecessary if user authentication can be automatically established by leveraging concurrent authentication with another secured system. However, the process of leveraging authentication information from one concurrently authenticated system to the next may result in a delay that may be particularly problematic when the process determines that leveraging is unavailable such that manual entry of user authentication criteria is required after the delay.

Techniques are provided for reducing the delays otherwise experienced by some users during execution of the automated authentication process, including non-authenticated users who will wait only to find that they must manually enter authentication information after they have experienced the delays associated with attempts at automating authentication. Thus, a preliminary and quick inquiry can be made to determine whether a user is likely to be concurrently authenticated into another client/server application (e.g., AIM) from which authentication can be inferred. If no concurrent authentication is likely to be available, an interface can be immediately provided to solicit manual entry of authentication information from the user. However, if concurrent authentication is likely to be available, the user can be instructed to wait while automatic authentication is attempted by, for example, presenting an hourglass icon.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
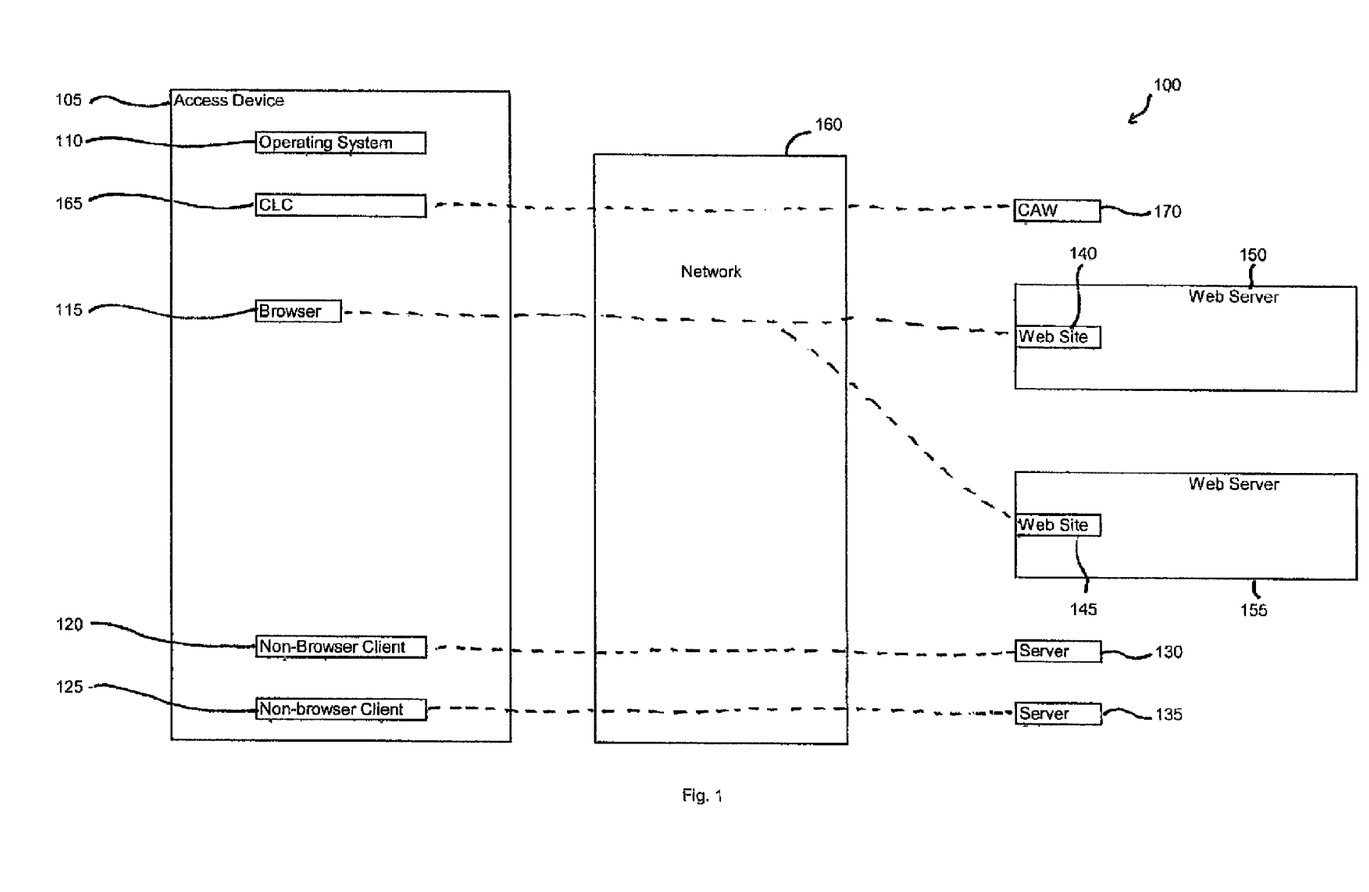
FIG. 1 is a block diagram illustrating components of a system used to enable leveraging authenticated access to a client.

Referring to FIG. 1, a system 100 includes an access device 105 that may be, for example, a personal computer (PC) or a mobile phone. The access device runs an operating system 110 (e.g., DOS, Windows®, Windows® 95, Windows® 98, Windows® 2000, Windows® NT, Windows® Millennium Edition, Windows® XP, OS/2, Macintosh OS, and Linux) and is configured to run different types of client/server applications, such as browser clients accessible using a browser 115 (e.g., Netscape's Navigator and Microsoft's Internet Explorer) and non-browser clients 120 and 125 (e.g., AOL client, CompuServe client, AIM client, AOL TV client, and ISP client). Each of non-browser clients 120 and 125 is associated with a corresponding server 130 or 135. Similarly, each browser client (or web site) 140 or 145 that is accessed using the browser 115 is defined as a collection of web pages supported by an associated web server 150 or 155.

The access device 105 communicates with the servers 130, 135, 150 and 155 through a network 160. The network 160 generally provides direct or indirect communication between the access device and the servers. Examples of a network 160 include the Internet, the World Wide Web, WANs (wide area networks), LANs (local area networks), analog or digital wired and wireless telephone networks (e.g., PSTN, ISDN, and xDSL), radio, television, cable, satellite, and/or any other delivery mechanism for carrying data. Connections to the network 160 may include, for example, wired, wireless, cable or satellite communication pathways.

The access device 105 also runs a common local authentication client (CLC) 165 that provides support for obtaining authenticated access to browser and non-browser clients. The CLC 165 is a shared, centralized component that facilitates leveraging of authenticated access to one client to obtain authenticated access to another client. Clients to which authenticated access may be obtained using the CLC 165 may be referred to as CLC-enabled clients. The CLC 165 runs on the access device 105 and interacts with a common authorization web server (CAW) 170. The CLC 165 may be a standard component of the operating system 110 of the access device 105, a component added to the operating system 110, or separate from the operating system 110. When the CLC 165 is to be added to the operating system but is not part of the operating system, a module that provides the CLC can be added to the operating system using, for example, a client running on the device 105.

The access device 105 typically includes one or more hardware components and/or software components. As noted above, one example of an access device 105 is a general-purpose computer (i.e., a personal computer) capable of responding to and executing instructions in a defined manner. Other examples include a special-purpose computer, a workstation, a server, a device such as a mobile phone, a component, other physical or virtual equipment, or some combination of these devices capable of responding to and executing instructions.

Using the system 100, a single sign-on experience can be provided in a client/server environment by leveraging authenticated access to a first CLC-enabled client to enable subsequent authenticated access to other CLC-enabled clients without requiring the user to provide credentials to obtain the subsequent access, and without the delays associated with entering such credentials.

CLC-enabled clients can be browser clients (e.g., web sites such as www.aol.com) and/or non-browser clients (e.g., AOL Instant Messaging (AIM)). Browser clients (i.e., web sites) are accessed using standard browsers (i.e., browsers that are commercially available such as Netscape Navigator or Microsoft Internet Explorer).

Web-based CLC-enabled clients maybe accessed through use of a standard web browser. Thus, a standard browser can be used to leverage authenticated access to one CLC-enabled client so as to enable a user to obtain seamless authenticated access to other CLC-enabled clients that ordinarily and otherwise require manual or separate authentication of the user. To obtain leveraged authenticated access, the browser communicates with the CLC 165, which acts as a common agent through which secure interactions are conducted.

These concepts may be particularly well-suited to enable cross-client authentication (e.g., between AOL's Screen Name Service (SNS) and Microsoft's Passport), to facilitate user access to client applications, and to reduce delays otherwise experienced during an authentication sharing process. Also, by using a standard browser client in the authentication sharing with other client applications, costs associated with supporting browser client modifications (e.g., development, testing, and maintenance of modifications for multiple versions of different browsers on multiple platforms) can be avoided.

In a general implementation, authentication sharing is enabled between multiple CLC-enabled clients, including browser and non-browser clients. To begin, a user initiates authentication into a client that may be a browser client (i.e., a web site such as www.aol.com) or a non-browser client (i.e., AIM). When successfully authenticated, the user can leverage the authentication to enable simplified access to other clients, which may be browser clients or non-browser clients, by leveraging the initial authentication. Interactions between clients are simplified, since each client only needs to support one authentication sharing interface. In particular, each CLC-enabled non-browser client can be updated with the interaction protocol of the CLC 165. Thus, rather than having each non-browser client support an interface with each other non-browser client, the CLC 165 and the non-browser clients share a protocol. The CLC 165 also includes a mini-HTTP server to enable communication with the standard browser so as to support CLC-enabled browser clients.

For purposes of supporting access by CLC-enabled browser clients, the CLC 165 can register with the operating system 110 to handle a URL protocol that leverages the browser in launching the CLC 165 in response to receipt of a call to a URL corresponding to the CLC 165 (i.e., to initiate a CLC session when the CLC 165 is not already running). Access and communications with the CLC 165 can be made with a user-specific channel if the HTTP server of the CLC 165 is available to other users of the access device.

Figure 2:
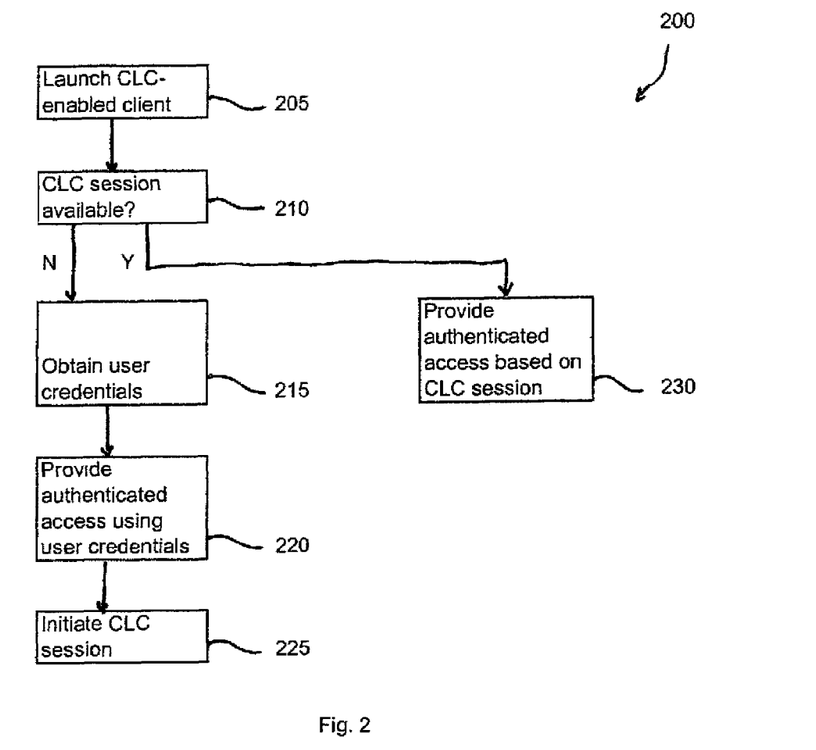
FIG. 2 is a flow chart illustrating initiation and use of leveraged authenticated access.

Referring to FIG. 2, authenticated access to CLC-enabled clients may be obtained according to a procedure 200.

Initially, a CLC-enabled client is launched (205). Launching a CLC-enabled client may include clicking on a link corresponding to a web site 140 or 145 (i.e., a browser client) while using the browser 115 or simply selecting a non-browser client 120 or 125 directly using a non-browser interface at the access device 105 (e.g., selecting an icon having a link to the non-browser client). As discussed in detail below, the operations performed vary based on whether the CLC-enabled client is a browser client or a non-browser client.

When a CLC-enabled client is launched, an inquiry is made as to whether a CLC session is available (210). For both browser and non-browser applications, this inquiry involves polling the operating system 110 to determine whether the CLC 165 is running. If no CLC session is available, user credentials (e.g., user name and password) are requested from the user (215). The user credentials then are used to provide authenticated access to the CLC-enabled client (220). In addition, since no CLC session was previously detected, a CLC session is initiated (225). The CLC session generally remains available until all clients running in the session are terminated (e.g., by having the user actively sign off from the clients or by having access to the clients time out). In certain implementations, a user who signs off from a CLC-enabled client may be given the option of terminating the CLC session and/or termination of all CLC-enabled clients associated with the session in addition to just signing off from the client. Termination of the CLC session means that a subsequent attempt to access a CLC-enabled client will require the user to provide credentials. If the inquiry (210) indicates that the CLC session is available, authenticated access to the CLC-enabled client is provided based on the existence of the CLC session (230). Thus, the user is able to leverage a prior authenticated access to a CLC-enabled client to obtain authenticated access to a different CLC-enabled client, and is not required to enter credentials again to access the different client.

A more detailed discussion of obtaining authenticated access now is provided with reference to FIGS. 3-7.

Figure 3:
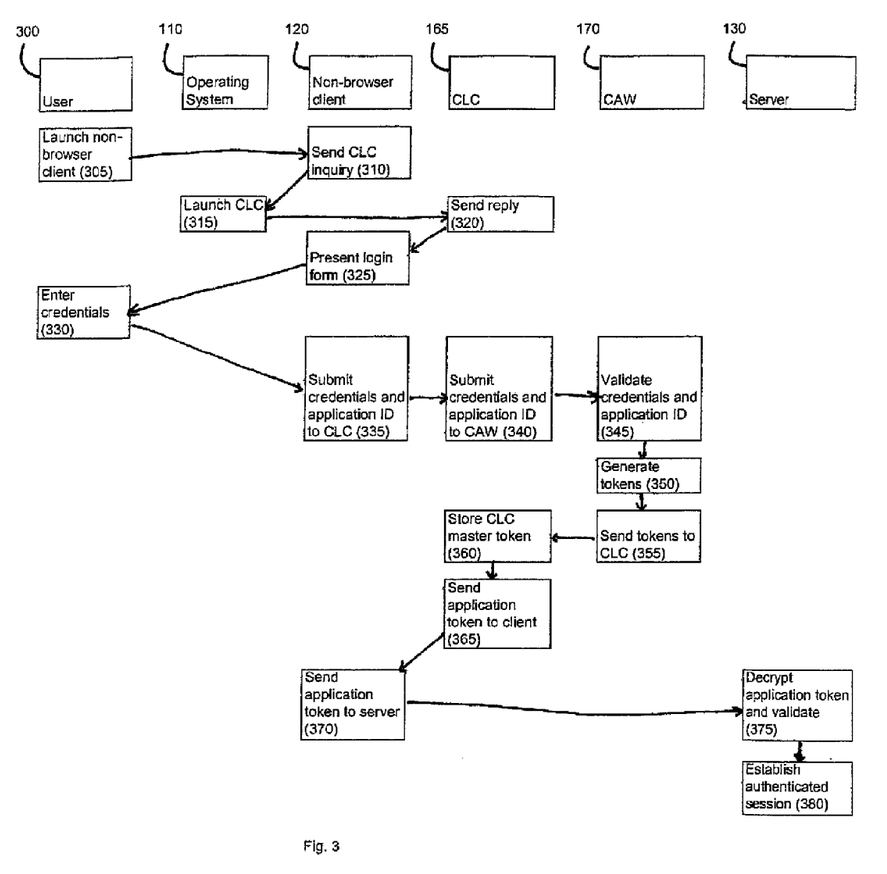
FIG. 3 is a flow diagram illustrating obtaining initial authenticated access to a non-browser client.

FIG. 3 illustrates how the access device 105 may be used to obtain initial authenticated access to a CLC-enabled non-browser client (e.g., non-browser client 120). Initially, a user 300 launches non-browser client 120 by, for example, double-clicking on an icon corresponding to the client 120 (305). The non-browser client 120 may correspond, for example, to the AOL Instant Messaging (AIM) client.

Upon being launched, the client 120 sends an inquiry to the operating system 110 to determine whether the CLC 165 is running and has an active authenticated session (310). As this is an initial authentication, the CLC 165 is not running and the operating system 110 responds by launching the CLC 165 (315). The CLC 165 then sends a reply indicating that an active authenticated session is not available (320). Upon receiving the reply from the CLC, the client 120 presents a login form to the user (325), and the user responds by entering his credentials (330), which may be, for example, a user name and a password. By checking whether the CLC 165 is running and has an active session, the process provides a very quick (e.g., on the order of milliseconds) determination of whether leveraged authentication is likely to be achieved. When the CLC does not have active authenticated session available, this determination lets the process quickly present the login form and thereby avoid delays in presenting the form that might occur in the event of a longer process for determining whether leveraged authentication is likely to be available.

The client 120 then submits the credentials and an application identification to the CLC 165 (335), which submits the credentials to the CAW 170 (340). The credentials are submitted along with an application identification (i.e., an identification that designates the client 120) that may include, for example, a version number.

The CAW 170 validates the user's credentials and the application identification (345). For example, the CAW 170 may check the application identification to determine whether the version of the application can be trusted. In other implementations, this validation may be performed by the CLC 165.

The validation of the user's credentials may include consulting a table of credentials to obtain credential information specific to, for example, the user or the application. For the purposes of this example, it is assumed that the user has a common user name and password that may be used to access all CLC-enabled non-browser clients and browser clients (i.e., web sites) of interest. In actual implementations, the table may maintain multiple user name/password combinations to permit a single user to access different clients, as well as user name/password combinations for other users.

After the user's credentials and the application identification are validated, the CAW 170 generates a CLC master authentication token and an application token (350). The CAW 170 then passes these tokens to the CLC 165 (355). The CLC 165 stores the CLC master token (360) and sends the application token to the client 120 (365). The client 120 sends the application token to the server 130 that supports the client 120 (370). The server 130 decrypts the application token to decrypt and validate the credential information (i.e., the user authentication data) necessary to access the client 120 (375). The server 130 then establishes an authenticated session to permit the user to access the client 120 (380).

Figure 4:
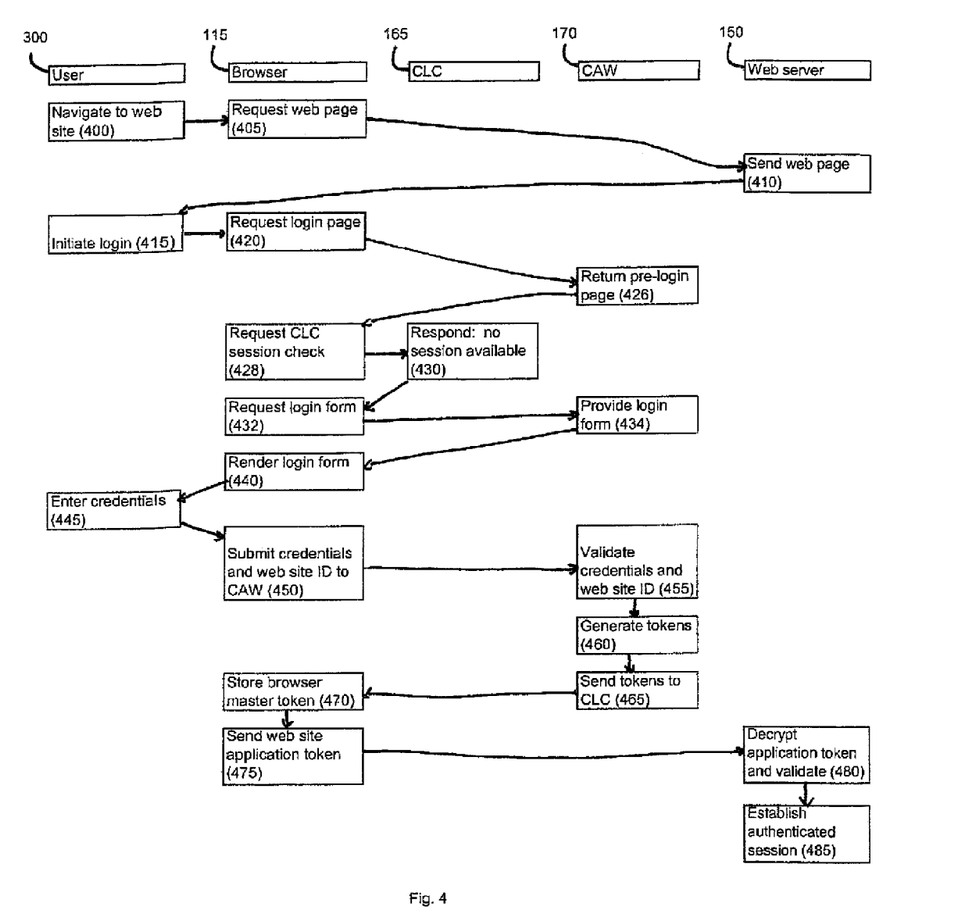
FIG. 4 is a flow diagram illustrating obtaining initial authenticated access to a web-based application through a standard browser.

FIG. 4 illustrates an alternative situation in which the initial authenticated access is obtained to a CLC-enabled browser application (e.g., web site 140 hosted by web server 150) through the browser 115. Initially, the user 300 uses the browser 115 to navigate to the web site 140, which, in this example, is www.mynetscape.com (400). The browser 115 responds by requesting a web page from the server 150 (405). In response to the request, the server returns the web page, which includes a login button (410).

The user then clicks on the login button of the web site to sign into the web site (415), and the browser 115 sends a request for a login page to the CAW 170 (420). Since the web site 140 is a CLC-enabled client, the CAW 170 returns a pre-login page to the browser 115 to instruct the browser 115 to check whether leveraging a prior authenticated CLC session is possible (426), and the browser 115 sends a request to the CLC 165 to make such a check (428). In this case, the CLC is not running and leveraging a concurrent authentication session in a non-browser client is not possible. Accordingly, the CLC 165 is launched and responds that no session is available (or the CLC does not respond or the operating system 110 responds that the CLC is not running) (430).

Since no prior authenticated access is available for leveraging, the browser 115 requests a login form from the CAW 170 (432), the CAW provides a login form (434), and the browser renders the login form (440). The check for a CLC session lets the process quickly present the login form and thereby avoid delays in presenting the form that might occur in the event of a longer process for determining whether leveraged authentication is likely to be available. If an available CLC session had been available, the CLC session would have been used and the login page would not have been sent.

In response to the rendered login form, the user enters his login credentials (445), and the browser submits the credentials and the web site application identification to the CAW 170 for verification (450). After the CAW 170 validates the credentials and the web site application identification (455), the CAW 170 generates a master browser token and a web site browser token (460). The CAW 170 then passes the tokens to the browser 115 (465). The browser stores the browser master token (470) and forwards the web site application token to the server 150 supporting the selected web site 140 (475). The web server 150 decrypts the web site application token and extracts user authentication data (480). Finally, the web server 150 uses the user authentication data to establish an authenticated session in the web site (485).

Figure 5:
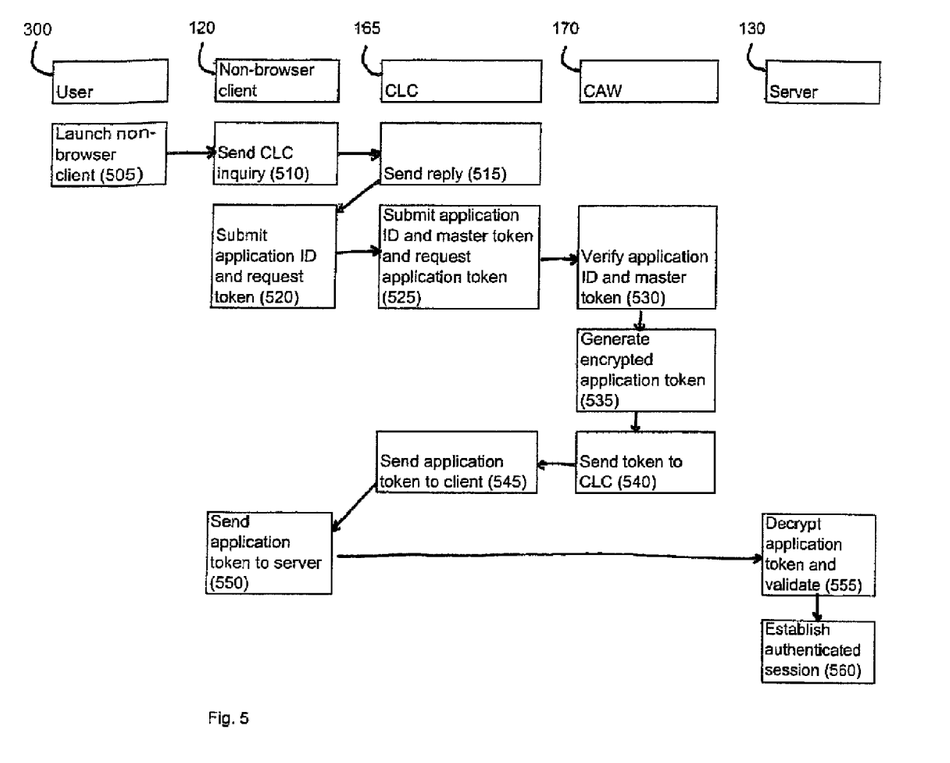
FIG. 5 is a flow diagram illustrating obtaining authenticated access to a non-browser client after previously being authenticated.

FIG. 5 illustrates how a user obtains authenticated access to a CLC-enabled non-browser client after having previously initiated a CLC session by obtaining authenticated access to a CLC-enabled browser client or a CLC-enabled non-browser client during the same session. Initially, the user launches a CLC-enabled non-browser client, such as non-browser client 125 (505). The non-browser client 125 sends an inquiry to the operating system 110 to determine whether the CLC 165 is already running and has an active authenticated session available (510). Since the CLC 165 is running and an authenticated session is available (since the user has already obtained authenticated access to the non-browser client 120), the CLC sends a reply to this effect (515). (In the discussion of FIG. 3, the CLC inquiry (310) was referred to as an inquiry to the operating system; the descriptions of the CLC inquiries (310) and (510) are both accurate descriptions of the same event. In both cases, a call is made to the CLC 165. In particular, when the CLC is not running (as in the situation discussed with respect to FIG. 3), this call is processed by the operating system, which launches the CLC so that the CLC can reply. By contrast, when the CLC is running, the call is processed by the CLC.)

Non-browser client 125 passes its application identification to the CLC 165 and requests an application token (520). The CLC 165 submits the application identification and the CLC master authentication token to the CAW 170 and requests an application token from the CAW 170 (525). The CAW 170 verifies the CLC master authentication token and the application identification (530).

If the CLC master authentication token and the application identification are valid, the CAW 170 generates an encrypted application token (535) and passes the application token to the CLC 165 (540). The CLC 165 passes the encrypted application token to the non-browser client 125 (545). The non-browser client 125 passes the encrypted application token to its associated server 135 (550). The associated server 135 decrypts the application token to extract user authentication data (555), and uses this data to establish an authenticated session for the user (560). Thus, the session is established without requiring the user to enter credentials to establish the session.

Figure 6:
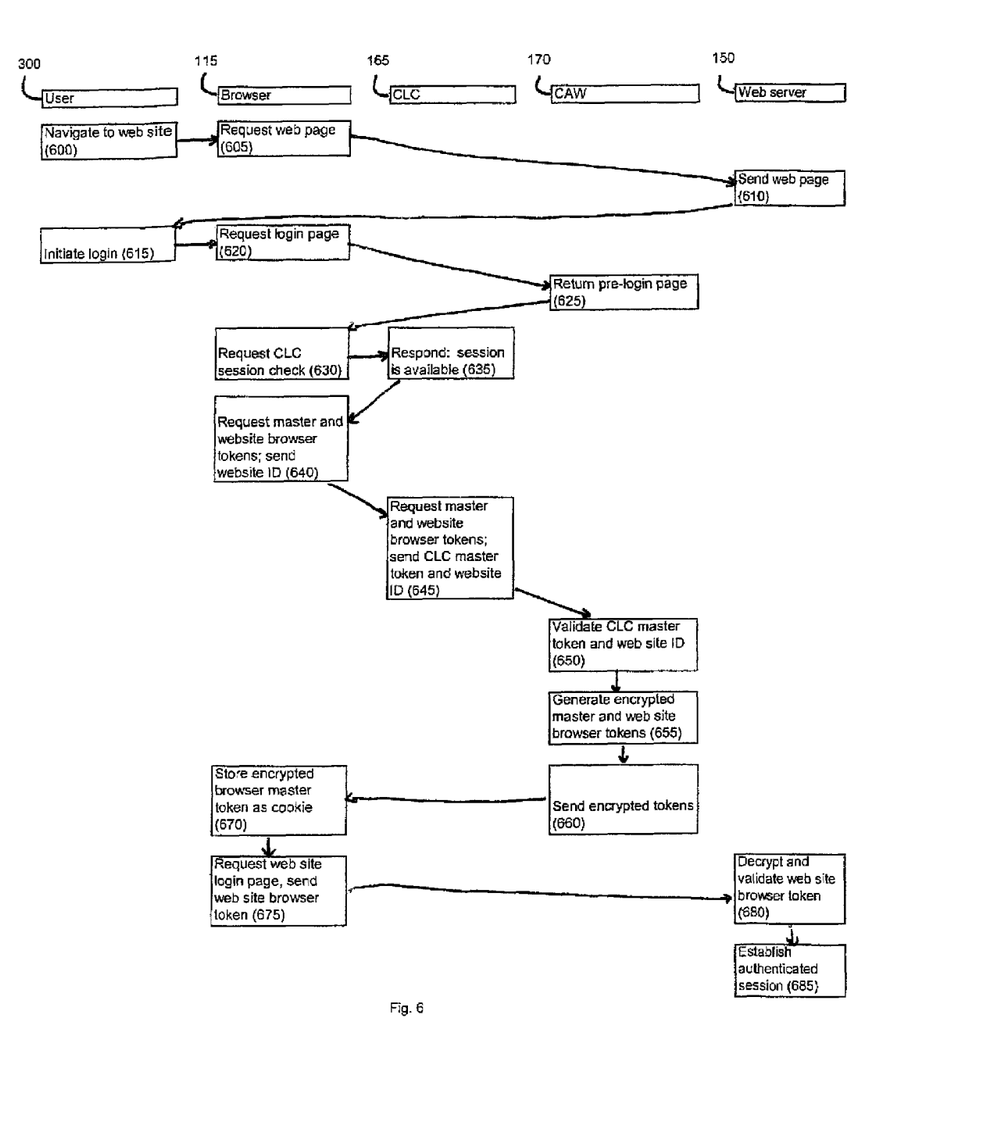
FIGS. 6 and 7 are flow diagrams illustrating obtaining authenticated access to a web based application after previously obtaining authenticated access to a non-browser client.

FIG. 6 illustrates how a user obtains authenticated access to a CLC-enabled web-based client through a browser after previously obtaining authenticated access to a non-browser client during the same session. Initially, the user navigates to the web site 140, which, in this example, is www.my-netscape.com (600). The browser 115 responds by requesting a web page from the server 150 (605). In response to the request, the server returns the web page, which includes a login button (610).

The user then clicks on the login button of the web site to sign into the web site (615), and the browser 115 sends a request for a login page to the CAW 170 (620). Since the web site 140 is a CLC-enabled client, the CAW 170 returns a pre-login page to the browser 115 to instruct the browser 115 to check whether leveraging a prior authenticated CLC session is possible (625), and the browser 115 sends a request to the CLC 165 to make such a check (630).

In this case, leveraging a concurrent authentication session is possible (i.e., an active CLC session is available). Accordingly, the CLC 165 responds by indicating that an available authenticated session exists (635).

The browser 115 then requests master and website browser tokens and sends a web site identification with the request (640). The CLC forwards the request and the web site identification to the CAW 170 along with the CLC master token (645).

The CAW 170 validates the CLC master authentication token and the web site identification (650). If the validation of the CLC master authentication token is successful, the CAW 170 generates an encrypted browser master authentication token and an encrypted web site application token (655) that the CAW 170 passes to the browser 115 (660).

The browser 115 stores the browser master authentication token as a cookie (670). The browser 115 also requests a web site login page from the server 150 and sends the web site browser token along with the request (675). The web server 150 decrypts and validates the web site browser token (680). Upon successful validation, the web server 150 establishes an authenticated session (685).

Figure 7:
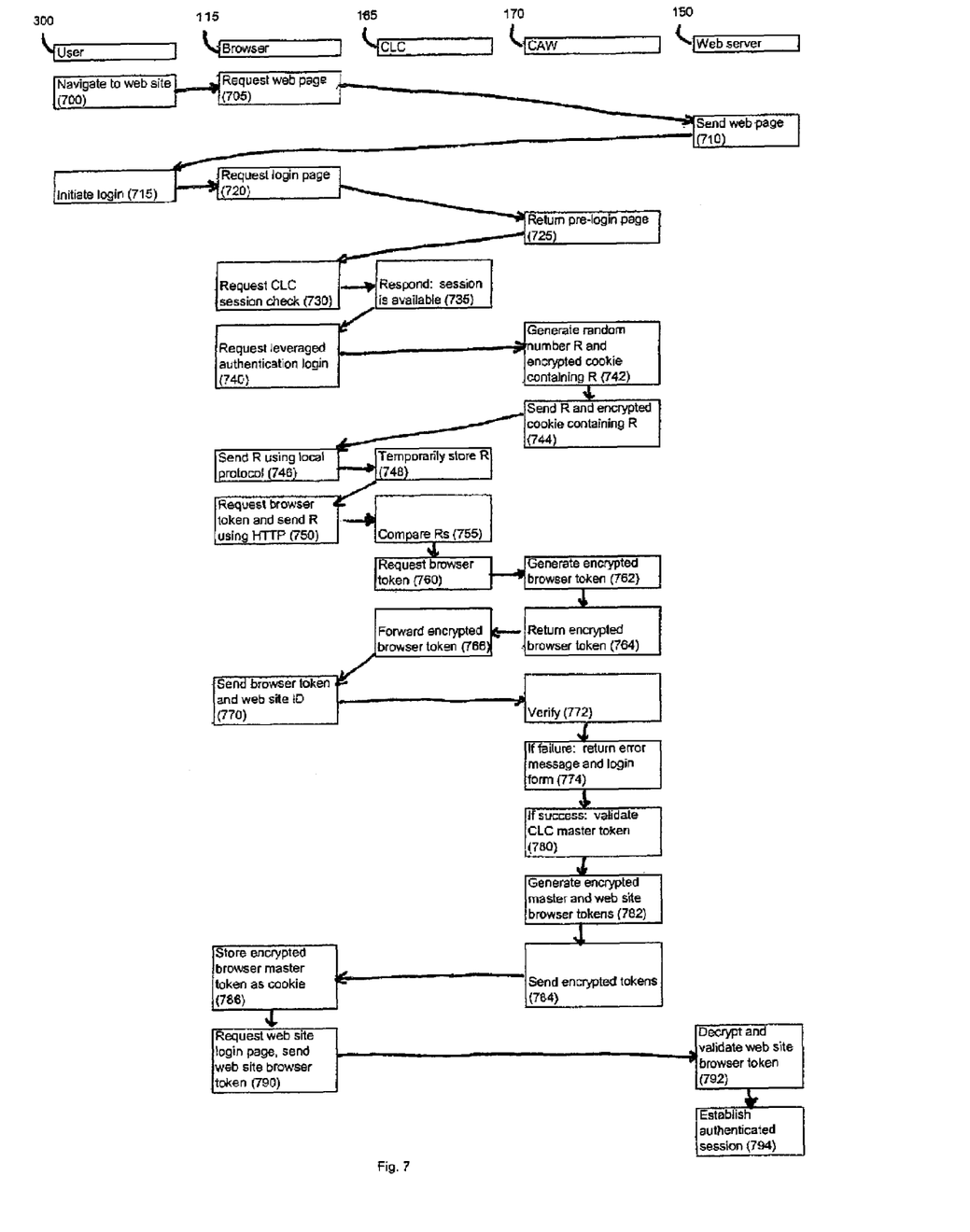

FIG. 7 illustrates an alternative to the approach of FIG. 6 to permitting a user to obtain authenticated access to a CLC-enabled web-based client through a browser after previously obtaining authenticated access to a non-browser client during the same session. Initially, the user navigates to the web site 140 (700). The browser 115 responds by requesting a web page from the server 150 (705). In response to the request, the server returns the web page, which includes a login button (710).

The user then clicks on the login button of the web site to sign into the web site (715), and the browser 115 sends a request for a login page to the CAW 170 (720). Since the web site 140 is a CLC-enabled client, the CAW 170 returns a pre-login page to the browser 115 to instruct the browser 115 to check whether leveraging a prior authenticated CLC session is possible (725), and the browser 115 sends a request to the CLC 165 to make such a check (730).

In this case, leveraging a concurrent authentication session is possible (i.e., an active CLC session is available). Accordingly, the CLC 165 responds by indicating that an available authenticated session exists (735).

The browser 115 then sends a request to the CAW 170 for a leveraged authentication login (740). The CAW 170 responds by generating a random number R and an encrypted cookie containing R (742) that the CAW 170 returns to the browser (744). The browser sends R to the CLC 165 using a local, user-specific protocol (746) and the CLC 165 temporarily stores R (748).

The browser 115 also requests a browser token and sends R using the HTTP protocol (750). The CLC 165 compares the two Rs to verify that the request for the browser token is from the local browser 115 (755).

Upon successfully verifying the request, the CLC 165 requests a browser token (760). In response, the CAW 170 generates (762) and returns (764) and encrypted browser token. The CLC 165 forwards the encrypted token to the browser 115 (766).

The browser 115 passes the web site application identification and the browser token to the CAW 170 (770). The CAW 170 checks the browser token, random number, and time stamp (772). If any of the checks fail, the CAW 170 responds with an error message and a login form with which the user can manually enter login credentials (774). The checks performed by the CAW 170 include reading and decrypting the cookies, comparing the passed values of the random number to ensure they match, and checking the timestamp in the browser token to ensure the token has not expired.

If the checks are successful, the CAW 170 extracts the CLC master authentication token from the browser token and validates the CLC master authentication token (780). If the validation of the CLC master authentication token is successful, the CAW 170 generates an encrypted master browser token and an encrypted web site browser token (782) that the CAW 170 passes to the browser 115 (784).

Figure 8:
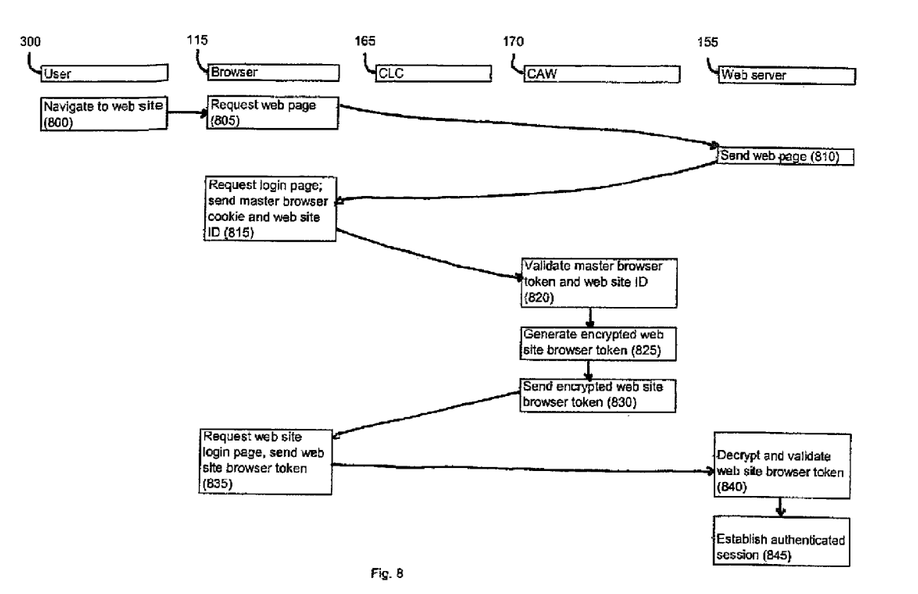
FIG. 8 is a flow diagram illustrating obtaining authenticated access to a web-based application after previously obtaining authenticated access to a web-based application using a browser client.

The browser 115 stores the browser master authentication token as a cookie (786). The browser 115 also requests a web site login page from the server 150 and sends the web site browser token along with the request (790). The web server 150 decrypts and validates the web site browser token (792). Upon successful validation, the web server 150 establishes an authenticated session (794). FIG. 8 illustrates how a user obtains authenticated access to a web-based client through the browser 115 after having previously obtained authenticated access to a web-based client during the same session (i.e., after the user has completed an initial authentication into a web application through a browser client as discussed above with respect to FIG. 3 or after the user has completed authentication into a web application through a browser client subsequent to an initial authentication into a non-browser client as discussed above with respect to FIGS. 6 and 7).

Initially, the user navigates to the web site 145 (800). The browser 115 responds by requesting a web page from the server 150 (805). In response to the request, the server returns the web page (810).

Since the web site 145 is a CLC-enabled browser client, and since the browser 115 has previously saved a master browser cookie in response to obtaining authenticated access to another CLC-enabled browser client, the browser requests a login page from the CAW 170 (815). The browser accompanies the request with the master browser cookie and a web site identification for the web site 145.

The CAW 170 receives and verifies the browser master authentication token and the web site identification (820). If the browser master authentication token and the application identification are successfully validated, the CAW 170 generates (825) and returns to the browser 115 (830) an encrypted web site browser token.

The browser 115 requests a web site login page from the server 155 and sends the web site browser token along with the request (835). The web server 155 decrypts and validates the web site browser token (840). Upon successful validation, the web server 150 establishes an authenticated session (845).

Figure 9:
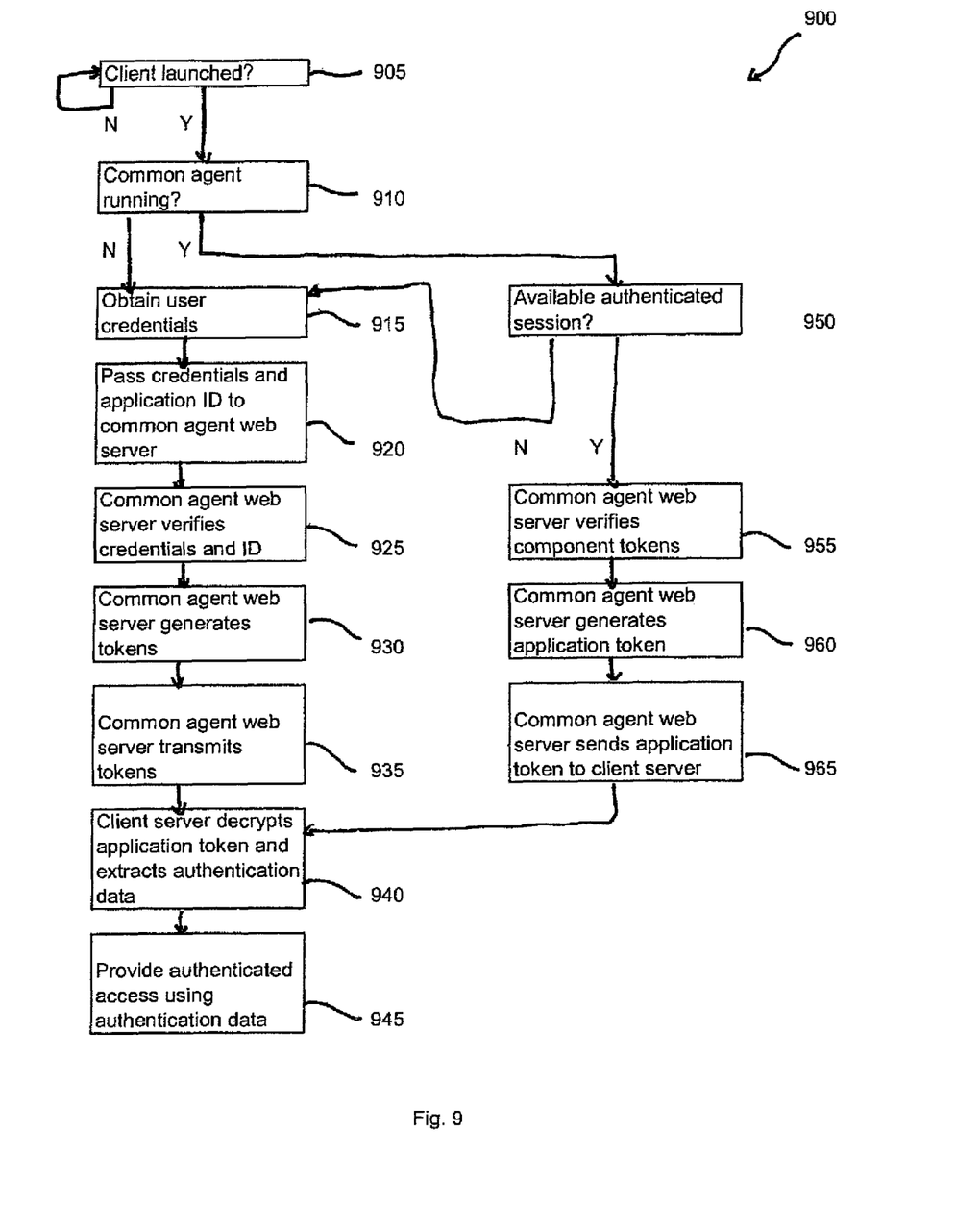
FIG. 9 is a flow chart illustrating a generalized process of obtaining initial authenticated access and leveraged authenticated access.

FIG. 9 illustrates a generalized description of a process 900 of establishing an initial authenticated session or establishing an authenticated session by leveraging an established authenticated session. Initially, a user of an access device launches a client application (905). Launching a client application may include launching a non-browser client such as, for example, AIM. Launching a client application also may include using a browser to navigates to a web site such as, for example, www.aol.com or www.mynetscape.com.

The client checks whether a common agent (e.g., the common local authentication client (CLC)) is running (910). In general, the common agent is either (1) not running, (2) running with an available authenticated session, or (3) running without an available authenticated session.

If a common agent is not running with an available authentication session, the user is prompted for and enters login credentials (915). The login credentials and an application identification then are passed to the common agent web server (CAW) (920), which validates the login credentials and the application identification (925).

Upon successful validation, the CAW generates component tokens, such as a common agent master authentication token, a browser master token, and a client application token (930). The client application token is specific to the non-browser client or web-based client (i.e., the web site). The CAW then passes the client application token to the client, which passes the token on to its supporting server, and passes the common agent master authentication token and the browser master token to their respective components (935).

The server supporting the client decrypts the client application token and extracts user authentication data (940). The server then uses the authentication data to establish an authenticated session (945).

If a common agent is running (910), then there is a check for an available authenticated session (950). If an authenticated session is not available, then the situation is treated as above following on from where the user enters login credentials (915) to establish an authenticated session.

If an authenticated session is available, the CAW verifies component tokens (955). For instance, depending on the client to which authenticated access is being sought, the CAW may validate the common agent master authentication token or the browser master token. Upon successful validation, the CAW generates an encrypted client application token that is specific to the non-browser client or the web-based client being accessed (960). The CAW then sends this token to the server supporting the client (965). As discussed above, the server supporting the client decrypts the client application token and extracts user authentication data for use in establishing an authenticated session (940 and 945).

One specific example of an implementation uses SNS ("Screen Name Service") as the secured system to which authentication is desired by a user device, and AIM ("AOL Instant Messaging") as the secured system from which authentication is leveraged. However, these references are merely exemplary and should not be deemed limiting of the concepts described.

Initially, SNS determines whether a local server exists to facilitate automated authentication, and does so, for example, by sending a request to the user device. For example, SNS may make a request to a local server (e.g., CLC) at the user device by way of a browser of the user device.

If the user device responds that no local server exists for servicing the request, SNS aborts the automated authentication process and proceeds to request authentication information from the user manually. SNS may do so, for example, by sending a HTML interface to the browser. (In certain implementations, SNS may use a lack of a reply from the user device as evidence that no local server exists.) The process of determining whether a local server exists typically takes just milliseconds, and avoids delays that may otherwise be experienced by unauthenticated users.

If the user device responds with an indication that a local server exists, SNS proceeds to attempt automated authentication and to inform the user of potential delays caused by this process, if necessary. SNS may inform the user of potential delays through use, for example, of an hourglass icon.

In a specific implementation, a user uses the browser of the user device to enter the URL of a secured site that the user wants to access. The browser processes the URL in an attempt to access the secured site. The secured site, upon determining that the user is not authenticated, initiates a process to determine whether user authentication can be inferred. For example, the secured site may itself perform the following process steps, or it may communicate with a centralized authentication service (e.g., SNS or some other master authentication site/service) that will perform the negotiations. The latter is assumed for purposes of the following discussion.

SNS receives the request for access by the user to the secured system, and determines whether the local device includes a server that is available for leveraging user authentication with another secured system. This is accomplished by submitting a request (in the form of an image tag) to the local server, and determining whether the local server is available to attempt negotiations based on whether the local server responds to the request.

In response to a request for access by the user, SNS supplies an HTML page that includes an embedded image tag to the browser of the requesting user device for rendering. Conventional image tags typically specify a machine ID, a port, and a path, which collectively correspond to a location of information appropriate for loading a requested image. In this case, the machine ID specified by the image tag corresponds to the user device, and the port specified by the image tag corresponds to a standard port for local cooperative authentication servers running at that user device.

Specifically, IP address=127.0.0.1 is universally recognized as corresponding to local client devices. Therefore, if an HTML page to be rendered by a browser includes an embedded image tag with a machine ID corresponding to IP=127.0.0.1, the browser at the user computer will seek information for rendering the image locally.

The port specified by the image tag corresponds to a port being monitored by a server on the local user device. The server is typically an extension to an existing non-browser client, such as AIM, that has already authenticated the user. As such, the server is generally installed with the client, and is activated and deactivated with the client.

The path for the image tag indicates which (of presumably several) resources should be rendered in satisfaction of the request by the local server located at the designated device and port. A first standard path is typically used for initial checking for existence of the server, and one or more additional standard paths are typically used during actual authentication interactions.

The browser of the user device perceives the HTML page request from SNS, reads the image tag associated with an image request within the HTML page request, and identifies the port associated with the image tag.

The server at the user device is configured to monitor/service traffic over the specified port of the user device. This local server is generally configured to accept authentication related requests only from the local user device. The server therefore perceives the requested URL within the embedded tag, accesses a small image (e.g., a 10×10 pixel image) that is stored locally, for example, in anticipation of such a requested URL, and responds by sending the small image to be loaded by the browser into the HTML page.

The browser receives the information for loading the image tag, loads the image into the HTML page, and displays the image. However, as indicated, the image is small (e.g., a 10×10 pixel image) and may be otherwise discretely configured. Conventional browsers support such loading, and special extensions to existing web browser technology are not required to display the image-loaded page which, in this example, is a mere dot which quickly vanishes in steps that follow.

Javascript (JS) at the browser determines whether an image was received, which indicates whether the potential for leveraging authentication exists. In particular, the successful retrieval of the 10×10 image indicates the potential for leveraging authentication exists. Note that this support is also standard in all web browser's support of JS, and no browser extension is required.

The JS then conditionally either replaces the displayed page with a manual login page or with a page that will proceed to automatically interact with the local server to complete the authentication process. The replacement is accomplished either by directing the browser to contact the SNS server to acquire alternate content, or by selecting alternate content (e.g., content containing JS) that was loaded as part of the initial page. Again, no extension to standard web browser JS functionality is necessary for this process.

If the local server is deemed available for negotiating whether to leverage user authentication to another secured system, such negotiations are initiated and, if necessary, the user is informed of the potential for delays that will be experienced during the negotiation of authentication information. Otherwise, if the local server is not deemed available, the user is presented with a user interface that enables manual entry of authentication information without further delays related to leveraging of user authentication to alternative secured systems.

The process for deciding between automatic and manual authentication typically takes less than a second. As such, the SNS is quickly provided with information that enables a decision as to whether manual entry of authentication will likely be required of the user, thus necessitating the presentation of an interface HTML page soliciting that information. Alternatively, SNS will proceed with automated authentication and merely provide to the user, if necessary, an indication of this process (e.g., an hourglass) or of potential delays that may be experienced during this process.

In an example of automated authentication, the following process may be performed if an image is returned by a server at the local user device to the browser of that device in response to an image tag provided by SNS. Effectively, the following process enables user access to the desired secured site without manual entry of user authentication credentials.

SNS sends a request to the browser to load another HTML page. This HTML page also embeds an image tag, and the image tag again specifies the local machine (1P=127.0.0.1) and the port of the local server on that machine. In addition, this tag also specifies a path (e.g., a URL) that differs from the image tag originally sent (and described above).

The browser receives the requested HTML page and directs the image tag to the local server for loading. The local server perceives the image tag and looks for the particular path associated with the image tag. The local server is pre-configured to generate a consequential request in response to the path specified in this image tag. The request specifies the local server identity, and requests authentication credentials from the AIM host. The request is directed from the local server to another secured system (e.g., AIM) for leveraging of previous authenticated access to that system.

The AIM host server receives the request from the local server and provides encrypted credentials (e.g., a number that is understandable only to the AIM host). The local server receives the encrypted credentials from the AIM host, and responds to the image tag request from the browser by redirecting the browser to seek satisfaction of the image tag from SNS. The local server redirects the image to the URL at SNS as a matter of course, preventing the local server from being lured into leaking credential information to any site or service other than the true SNS server.

The browser then requests an image from SNS based on the image tag originally provided by SNS. In addition, because a number representing the encrypted (or encoded) credentials is embedded in the redirection instruction provided from the local server to the browser, they also are provided to SNS with the request. Note that the number may not be reflective of the credentials themselves, but may instead be used to enable a lookup of those credentials.

SNS recognizes the image tag based on the embedded path (e.g., the URL). Accordingly, SNS knows to look for the number representing encrypted credentials that is provided with the redirected image tag.

SNS locates the encrypted credentials within the image tag, and authenticates the user based on the existence of the number. However, because this process began with SNS requesting an HTML page that includes an image, the process includes a response by SNS to the redirected image tag with a cookie that is based on the encrypted credentials. The browser then builds the cookie into the HTML page that is returned to the SNS server to conclude the request. SNS may solicit additional information (e.g., a screen name) from the browser, and may process that information.

The shared authentication technique and protocol provide secure and accurate identification of the users of the system and prevent users from impersonating other users. To prevent impersonation through misuse of the shared authentication system, token forgery and tampering are prevented, user login names are protected, unauthorized web sites are prevented from obtaining authentication tokens, unauthorized replay of authentication tokens is prevented, and access to authentication tokens is restricted. To prevent token forgery and tampering with authentication tokens, where a hacker forges or modifies a token to impersonate another user, tokens may contain a checksum of their contents and may be encrypted with a secret key that is unknown to the hacker. As a result, hackers cannot modify existing tokens or forge new tokens undetected. To prevent third party applications from obtaining a user's login name (and potentially violating a user's privacy), the authentication token may be encrypted and may be validated on the server side. The client application may not have direct access to the token information and may be prevented from getting a user's login name directly.

Transmission of an authentication token from the CLC to the authenticated system's web server using a browser client prevents a hacker's web page from being able to request and obtain an authentication token from the common agent and thereafter pass the token to the hacker's web server. Rather, the token is passed from the common agent to the authenticated system's web server as query data on an authenticated system web server URL returned to the browser from the common agent in the form of an HTTP redirect in response to an image request. Even if a hacker is able to return a hacked web page containing the common agent token-request URL, the returned token is not exposed to JavaScript or otherwise available to the hacker's web page, and hence is not available to the hacker to send back to his server. Alternatively, network packet sniffers that capture tokens as the tokens come across the network are blocked from capturing authentication tokens by only communicating tokens across SSL connections.

Unauthorized token replay (i.e., unauthorized use of a token captured from another user) may be prevented by including a timestamp within the token to indicate when the token was generated. Servers that receive and process the tokens may reject tokens that are older than a configurable maximum age to restrict the amount of time during which a captured token can possibly be replayed. Also, the tokens may include a random number that must also be present in an encrypted cookie that is only readable and writable by the authentication system's web server on the user's browser. Once the cookie is stored on a user's browser, the cookie is not accessible to the hacker's web pages or web server.

Access to authentication tokens to the current, local user session may be restricted by stipulating that authentication tokens are sent to and from the common agent through browser interactions with a URL protocol handler registered to the common agent at the operating system level, and implementing the common agent's URL protocol handler in such a way that only requests from the current local user session are processed and other requests (e.g., requests from a remote user on the same system) are rejected.

A number of implementations have been described. Nevertheless, it will be understood that various modifications may be made. For example, subsequent authentication may be into a non-browser client from a browser or subsequent authentication may occur in parallel or in a spoke-like manner, rather than serially (linearly), as described above. Accordingly, other implementations are within the scope of the following claims.

What is claimed is:

1. A method, comprising:
   establishing, based on an authentication credential provided by a user via a first client application, a first authenticated session for a computing device, the first authenticated session being associated with the first client application;
   generating a master authentication token and a first authentication token corresponding to the first authentication session;
   responsive to an authentication request associated with a second client application, generating, based on the master authentication token and an identification of the second client application, a second authentication token comprising a session identifier different from a session identifier of the first authentication token; and
   using the second authentication token to establish a second authenticated session for the computing device, the second authenticated session being associated with the second client application.

2. The method of claim 1, wherein the computing device comprises a mobile device having a wireless network connection with one or more servers associated with the first client application, and a wireless network connection with one or more servers associated with the second client application.

3. The method of claim 1, wherein the computing device comprises a mobile phone.

4. The method of claim 1, wherein the first client application comprises an application executing in a browser application executing on the computing device, and the second client application comprises a different application executing in the browser application.

5. The method of claim 1, wherein the first client application comprises an application executing in a browser application executing on the computing device, and the second client application comprises a non-browser application executing on the computing device.

6. The method of claim 1, wherein the first client application comprises a non-browser application executing on the computing device, and the second client application comprises an application executing in a browser application executing on the computing device.

7. The method of claim 1, wherein the first client application comprises a non-browser application executing on the computing device, and the second client application comprises a different non-browser application executing on the computing device.

8. A system, comprising:
at least one processor; and
a memory storing instructions that when executed by the at least one processor cause the system to:
establish, based on an authentication credential provided by a user via a first client application, a first authenticated session for a computing device, the first authenticated session being associated with the first client application;
generate a master authentication token and a first authentication token corresponding to the first authentication session;
responsive to an authentication request associated with a second client application, generate, based on the master authentication token and an identification of the second client application, a second authentication token comprising a session identifier different from a session identifier of the first authentication token; and
use the second authentication token to establish a second authenticated session for the computing device, the second authenticated session being associated with the second client application.

9. The system of claim 8, wherein the computing device comprises a mobile phone.

10. The system of claim 8, wherein the first client application comprises an application executing in a browser application executing on the computing device, and the second client application comprises a different application executing in the browser application.

11. The system of claim 8, wherein the first client application comprises an application executing in a browser application executing on the computing device, and the second client application comprises a non-browser application executing on the computing device.

12. The system of claim 8, wherein the first client application comprises a non-browser application executing on the computing device, and the second client application comprises an application executing in a browser application executing on the computing device.

13. The system of claim 8, wherein the first client application comprises a non-browser application executing on the computing device, and the second client application comprises a different non-browser application executing on the computing device.

14. One or more non-transitory computer-readable media having instructions stored thereon that when executed by one or more computers cause the one or more computers to:
establish, based on an authentication credential provided by a user via a first client application, a first authenticated session for a computing device, the first authenticated session being associated with the first client application;
generate a master authentication token and a first authentication token corresponding to the first authentication session;
responsive to an authentication request associated with a second client application, generate, based on the master authentication token and an identification of the second client application, a second authentication token comprising a session identifier different from a session identifier of the first authentication token; and
use the second authentication token to establish a second authenticated session for the computing device, the second authenticated session being associated with the second client application.

15. The one or more non-transitory computer-readable media of claim 14, wherein the computing device comprises a mobile device having a wireless network connection with one or more servers associated with the first client application, and a wireless network connection with one or more servers associated with the second client application.

16. The one or more non-transitory computer-readable media of claim 14, wherein the computing device comprises a mobile phone.

17. The one or more non-transitory computer-readable media of claim 14, wherein the first client application comprises an application executing in a browser application executing on the computing device, and the second client application comprises a different application executing in the browser application.

18. The one or more non-transitory computer-readable media of claim 14, wherein the first client application comprises an application executing in a browser application executing on the computing device, and the second client application comprises a non-browser application executing on the computing device.

19. The one or more non-transitory computer-readable media of claim 14, wherein the first client application comprises a non-browser application executing on the computing device, and the second client application comprises an application executing in a browser application executing on the computing device.

20. The one or more non-transitory computer-readable media of claim 14, wherein the first client application comprises a non-browser application executing on the computing device, and the second client application comprises a different non-browser application executing on the computing device.

* * * * *